United States Patent
Telefus et al.

(10) Patent No.: US 10,992,236 B2
(45) Date of Patent: Apr. 27, 2021

(54) HIGH EFFICIENCY AC DIRECT TO DC EXTRACTION CONVERTER AND METHODS

(71) Applicant: INTELESOL, LLC, Danville, CA (US)

(72) Inventors: Mark Telefus, Orinda, CA (US); Harry Rodriguez, Gilroy, CA (US)

(*) Notice: Subject to any disclaimer, the term of this patent is extended or adjusted under 35 U.S.C. 154(b) by 150 days.

(21) Appl. No.: 16/340,672

(22) PCT Filed: Jun. 29, 2017

(86) PCT No.: PCT/US2017/040052
§ 371 (c)(1),
(2) Date: Apr. 9, 2019

(87) PCT Pub. No.: WO2018/080604
PCT Pub. Date: May 3, 2018

(65) Prior Publication Data
US 2019/0238060 A1    Aug. 1, 2019

Related U.S. Application Data

(60) Provisional application No. 62/414,467, filed on Oct. 28, 2016.

(51) Int. Cl.
*H02M 7/06* (2006.01)
*H02M 1/08* (2006.01)

(52) U.S. Cl.
CPC ............... *H02M 7/06* (2013.01); *H02M 1/08* (2013.01)

(58) Field of Classification Search
None
See application file for complete search history.

(56) References Cited

U.S. PATENT DOCUMENTS

| | | |
|---|---|---|
| 4,074,345 A | 2/1978 | Ackermann |
| 4,127,895 A | 11/1978 | Krueger |
| 4,466,071 A | 8/1984 | Russell, Jr. |
| 4,581,540 A | 4/1986 | Guajardo |
| 4,631,625 A | 12/1986 | Alexander et al. |
| 4,760,293 A | 7/1988 | Hebenstreit |
| 4,812,995 A | 3/1989 | Girgis et al. |
| 5,121,282 A | 6/1992 | White |
| 5,371,646 A | 12/1994 | Biegelmeier |
| 5,654,880 A | 8/1997 | Brkovic et al. |
| 5,796,274 A | 8/1998 | Willis et al. |

(Continued)

OTHER PUBLICATIONS

Carvou, E. et al, Electrical Arc Characterization for Ac-Arc Fault Applications, 2009 Proceedings of the 55th IEEE Holm Conference on Electrical Contacts, IEEE Explore Oct. 9, 2009.

(Continued)

*Primary Examiner* — Jeffery S Zweizig
(74) *Attorney, Agent, or Firm* — Mark Wisnosky

(57) ABSTRACT

An improved AC direct to DC extraction conversion system is described. The AC direct to DC extraction conversion system consists of an efficient electronic switch employed to provide controlled pulsed power to a storage device. The AC to DC converter in one minimal version consists of a pair of N-MOSFET transistors, a voltage divider, a storage element and a pair of diodes. The design enables high efficiency with minimal components that may be fully integrated onto silicon.

8 Claims, 16 Drawing Sheets

(56) References Cited

U.S. PATENT DOCUMENTS

| | | | |
|---|---|---|---|
| 5,933,305 | A | 8/1999 | Schmaltz et al. |
| 6,081,123 | A | 6/2000 | Kasbarian et al. |
| 6,111,494 | A | 8/2000 | Fischer |
| 6,141,197 | A | 10/2000 | Xu |
| 6,169,391 | B1 | 1/2001 | Lei |
| 6,188,203 | B1 | 2/2001 | Rice et al. |
| 6,300,748 | B1 * | 10/2001 | Miller ............... G05F 1/565 323/266 |
| 6,538,906 | B1 | 3/2003 | Ke et al. |
| 6,813,720 | B2 | 11/2004 | Leblanc |
| 6,839,208 | B2 | 1/2005 | MacBeth et al. |
| 6,984,988 | B2 | 1/2006 | Yamamoto |
| 7,053,626 | B2 | 5/2006 | Monter et al. |
| 7,110,225 | B1 | 9/2006 | Hick |
| 7,164,238 | B2 | 1/2007 | Kazanov et al. |
| 7,319,574 | B2 | 1/2008 | Engel |
| 7,586,285 | B2 | 9/2009 | Gunji |
| 7,693,670 | B2 | 4/2010 | Durling et al. |
| 7,715,216 | B2 * | 5/2010 | Liu ............... H02M 7/155 363/89 |
| 7,729,147 | B1 | 6/2010 | Wong et al. |
| 7,746,677 | B2 | 6/2010 | Unkrich |
| 7,948,719 | B2 | 5/2011 | Xu |
| 8,374,729 | B2 | 2/2013 | Chapel et al. |
| 8,463,453 | B2 | 6/2013 | Parsons, Jr. |
| 8,560,134 | B1 | 10/2013 | Lee |
| 8,717,720 | B2 | 5/2014 | Deboer |
| 8,817,441 | B2 | 8/2014 | Callanan |
| 8,947,838 | B2 | 2/2015 | Yamai et al. |
| 9,054,587 | B2 * | 6/2015 | Neyman ............ H02M 7/2176 |
| 9,287,792 | B2 | 3/2016 | Telefus et al. |
| 9,577,420 | B2 | 2/2017 | Ostrovsky et al. |
| 9,621,053 | B1 | 4/2017 | Telefus |
| 2004/0032756 | A1 | 2/2004 | Van Den Bossche |
| 2008/0180866 | A1 | 7/2008 | Wong |
| 2008/0204950 | A1 | 8/2008 | Zhou et al. |
| 2009/0168273 | A1 | 7/2009 | Yu et al. |
| 2009/0213629 | A1 | 8/2009 | Liu et al. |
| 2010/0091418 | A1 | 4/2010 | Xu |
| 2010/0155369 | A1 | 6/2010 | Kularatna et al. |
| 2010/0320840 | A1 | 12/2010 | Fridberg |
| 2011/0156610 | A1 | 6/2011 | Ostrovsky et al. |
| 2011/0292703 | A1 | 12/2011 | Cuk |
| 2012/0026632 | A1 | 2/2012 | Acharya et al. |
| 2012/0089266 | A1 | 4/2012 | Tomimbang et al. |
| 2014/0085940 | A1 | 3/2014 | Lee et al. |

OTHER PUBLICATIONS

Yang et al, Series Arc Fault Detection Algorithm Based on Autoregressive Bispectrum Analysis, Algorithms 2015, 8, 929-950; doi:103390/a8040929.

Restrepo, Arc Fault Detection and Discrimination Methods, Electrical Contacts—2007 Proceedings of the 53rd IEEE Holm Conference on Electrical Contacts, IEEE Explore Sep. 24, 2007.

Eguchi et al, Design of a Charge-Pump Type AC-DC Converter for RF-ID Tags, 2006 International Symposium on Communications and Information Technologies, F4D-3, IEEE (2006).

Park, Jeong-Eon, et al, Design on Topologies for High Efficiency Two-Stage AC-DC Converter, 2012 IEEE 7th International Power Electronics and Motion Control Conference—ECCE Asia Jun. 2-5, 2012, Harbin, China, p. 257.

Cuk, Slobodan, 98% Efficient Single-Stage AC/DC Converter Topologies, Power Electronics Europe, Issue 4, 2011, www.power-mag.com; p. 16.

Ayari, A et al, Active Power Measurement Comparison Between Analog and Digital Methods, International Conference on Electrical Engineering and Software Applications 2013.

Gregory, George D. The Arc-Fault Circuit Interrupter, An Emerging Product, IEEE 1998.

* cited by examiner

HIGH EFFICIENCY AC DIRECT TO DC EXTRACTION CONVERTER AND METHODS

CROSS-REFERENCE TO RELATED APPLICATIONS

This application claims priority to U.S. Provisional application 62/414,467, Titled: High Efficiency AC to DC Converter and Methods, Filed Oct. 28, 2016. Both applications include a common inventor.

STATEMENT REGARDING FEDERALLY SPONSORED RESEARCH OR DEVELOPMENT

Not Applicable.

BACKGROUND OF THE INVENTION

Technical Field

The invention relates to a power management system and methods to provide low voltage DC current from AC mains at very high efficiency.

Related Background Art

The traditional early means for providing DC power from an AC mains was through analog circuitry that included a step-down transformer, a diode rectifier, and a filter comprising an electrolytic capacitor and resistor. The output voltage depended primarily on the turns ratio of the transformer and the circuit was moderately efficient. However, the size and weight of the magnetic structure required to implement the low frequency transformer obviates the use of this approach in miniature equipment.

A later approach that does not use a transformer involves the direct rectification of the AC mains which is directly connected to a voltage regulation circuit comprising an active solid-state device in either a series or shunt connection. The shunt regulator works by providing a current path across the rectified mains output through a variable resistance device, thereby diverting current away from the load. In the simplest implementation of the shunt regulator, a Zener diode is connected in shunt with the load with a resistor in series with this shunt leg. Any rectifier output voltage in excess of the Zener voltage is dropped across the resistor resulting in the excess power being dissipated as heat. Thus, this regulator configuration is very inefficient. Since the Zener current must be larger than the load current to maintain regulation through the Zener effect, the efficiency of this regulator circuit is much smaller than the ratio of the output voltage to the rms value of the rectified supply voltage.

An improved approach uses a series connected solid-state device, such as a bipolar or field-effect transistor, to buffer the Zener voltage reference. The active device is connected in a source-follower or emitter-follower configuration, with the load connected at the source or emitter and the Zener reference connected at the gate or base. The Zener current can be much smaller than in the shunt configuration, so the total current is largely that supplied to the load. Thus, the efficiency of this circuit is generally no better than the ratio of the input to output voltage.

A further improvement to this circuit function is termed a switch mode power supply. There are numerous such designs known in the art, but the commonality is an input rectifier, a switching element that operates at high speeds to switch a storage element, inductor or capacitor, into and out of the supply. If isolation of the input and output is required a high speed transformer is included for isolation and to regulate the output voltage. RC filters are included to reduce ripple in the output. Switch mode power supplies have an advantage of increased efficiency since the power loss mechanisms of the early linear systems are largely eliminated. However, there are transformer losses if isolation is required. Also, the high speed switching is a source of considerable RF noise as well as losses in conductors due to skin effects. Theoretically high efficiencies can and have been obtained in specially designed systems. Efficiencies as high as 95% are reported, but, in reality for low cost isolated systems normal efficiencies are 60 to 70%. A disadvantage of all heretofore known systems is that they cannot be easily integrated. Except for restricted special applications, the designs for present AC to DC converters cannot be integrated on a chip with other system functions. The power dissipated in individual circuit elements is too large for system-on-a-chip levels of integration. Components such as the types of transformers required are simply not available for integration on silicon.

The electronics devices that are ubiquitous typically operate at 3.3 or 5 volts. The requirement to convert 120 or 240 volts AC mains to these low operating voltages taxes the efficiency of the heretofore available power converters. For both linear and switched power supplies the greater the difference between the input and output voltages the greater the inefficiency. There is a need for a high efficiency and low voltage power supply to supply power to the myriads of low power, low voltage consumer devices. Electronics proliferate in "smart" cars and "smart" homes. There is a need for small, efficient power supplies that can support always-on sensors and networks. More and more homes, factories and office buildings, including both new construction and retrofitting, are incorporating electronic sensors to control all uses of power for increased efficiency. There is a need for a low voltage, integrated, high efficiency power supply to support both new construction and retrofitting the power grid existing in homes, factories and office buildings. The power supply must be able to be integrated into the sensor and control electronics to enable such devices to physically fit within the confines of plugs and outlets used to supply local power. There is a need for high efficiency to avoid heat dissipation within the confines of the walls and power grids of homes, offices and factories. There is a need for power converters that have efficiencies in the range of 99 to 100%. There is a need for compact power converters that can fit within a wide range of devices rather than existing as bulky boxes external to the devices. There is a need for power converters that can be integrated.

SUMMARY OF THE INVENTION

An AC to DC power conversion system is described. The AC direct to DC extraction conversion system and related devices address the need for a compact, integrated, low cost design, that is highly efficient and provides access to the low voltages used to drive typical silicon based electronic devices used in home sensors and networking, smart cars, etc. In one embodiment, the system includes an efficient electronic switch employed to disconnect the input of a series voltage regulator circuit from a rectified AC mains power supply to reduce the power dissipated within the series regulator. While the switch is closed, energy is accumulated and stored in a shunt energy storage element. The electronic switch is opened when the rectified AC mains waveform exceeds a threshold value. While the switch is open, energy is supplied to the load by the energy storage element through the regulator circuit. In this way the benefits of the regulator circuit accrue to the attached load circuitry while the power dissipated within the regulator circuit is greatly reduced compared to the prior art. A comparator is used to control the electronic switch. In one embodiment the comparator is comprised of an operational amplifier and a reference voltage source. In another embodiment the comparator is comprised of a MOS field effect transistor. In one embodiment the MOS field effect transistor is controlled through a voltage divider. In another embodiment the voltage divider is replaced with a reference voltage source. In other embodiment the reference voltage is adjustable.

The specific examples are not intended to limit the inventive concept to the example application. Other aspects and advantages of the invention will be apparent from the accompanying drawings and detailed description.

DETAILED DESCRIPTION OF THE INVENTION

Figure 1:
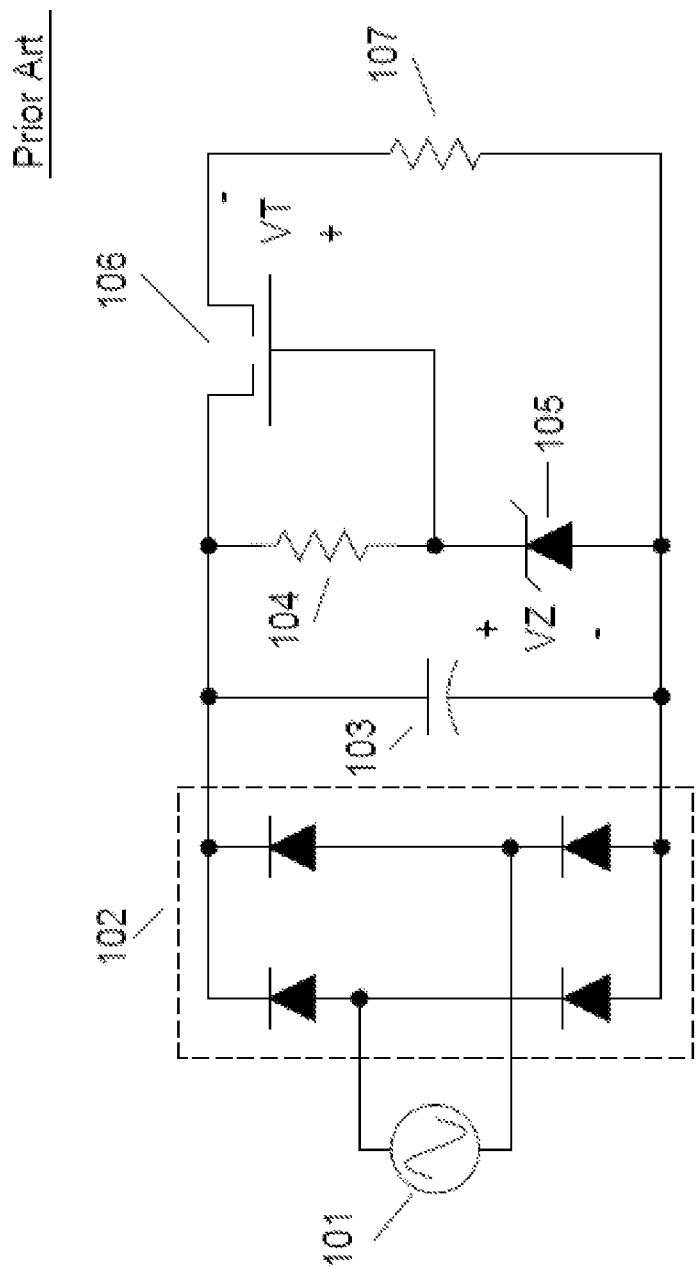
FIG. 1 is a schematic diagram of a prior art AC-DC converter.

FIG. 1 shows a schematic diagram of a prior art AC-DC converter circuit. AC mains 101 are full-wave rectified by diode bridge 102 and the resulting time-varying DC voltage waveform is smoothed by capacitor 103, typically an electrolytic capacitor. Note that there is no control for the charging of this capacitor 103. The full rectified line voltage is applied to this capacitor therefore a large capacity capacitor is required. The smoothed voltage waveform is applied to the input of a series regulator circuit including bias resistor 104, Zener diode 105 having a characteristic Zener voltage $V_Z$, and pass transistor 106, here represented as an enhancement mode MOS field-effect transistor (MOSFET) having a characteristic threshold voltage, $V_T$. The regulator output is applied to the load 107.

In operation, the pass transistor 106 dynamically adjusts its drain-source voltage to keep the load voltage at $V_Z-V_T$. In other words, pass transistor 106 forms a source-follower circuit that buffers the Zener voltage, $V_Z$. Since the full load current passes through pass transistor 106, the efficiency of this regulator circuit is simply the ratio of the load voltage to the rms value of the supply voltage. Thus, if the desired load voltage is nominally 3.3V and the supply voltage is 120V rms, then the efficiency is less than 3%. Furthermore, if the load requires only a few tens of milliamperes of current, then pass transistor 106 must continuously dissipate several watts of power as heat. This amount of dissipation typically leads to an unacceptable temperature rise in miniature, enclosed equipment.

Figure 2:
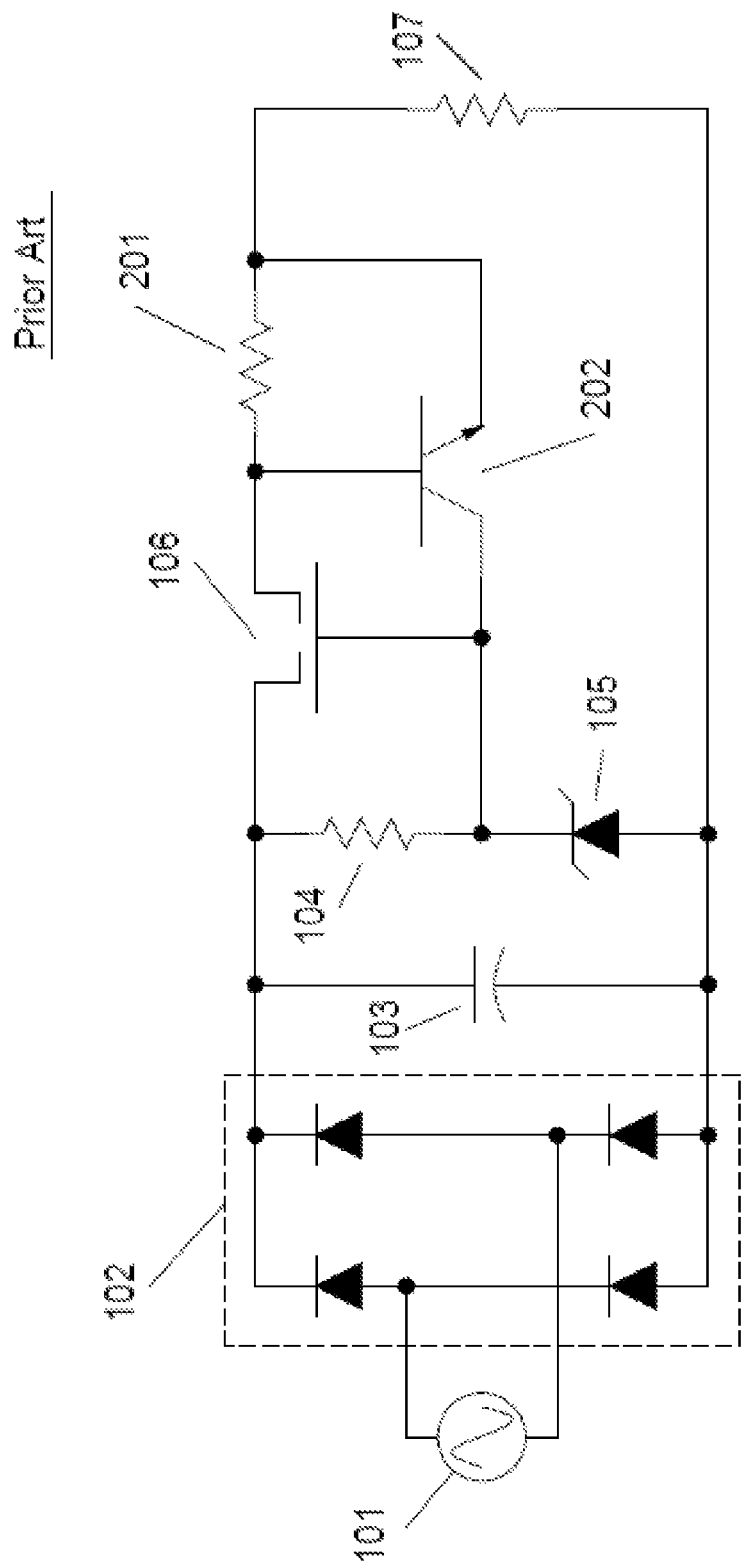
FIG. 2 is a schematic diagram of a prior art AC-DC convertor with current limiting.

A further limitation of the circuit of FIG. 1 is that it provides no protection against output current transients that could damage pass transistor 106. Such transients could occur as a result of accidental shorting of the output terminals during operation or testing, or as a result of capacitive load impedance components. FIG. 2 shows a schematic diagram of a prior art AC-DC converter that includes additional components to limit the output current, thereby protecting the pass transistor. In FIG. 2 a small current sensing resistor 201 is placed in series with the load, and bipolar transistor 202 is connected between the gate of the pass transistor 106 and the load. Now if the voltage drop across resistor 201 exceeds approximately 0.7V (for silicon bipolar transistors) then transistor 202 begins to conduct which reduces the gate-source bias on pass transistor 106, thereby reducing the output current. However, the efficiency of this improved circuit is essentially unchanged compared to that of the circuit shown in FIG. 1.

Figure 3:
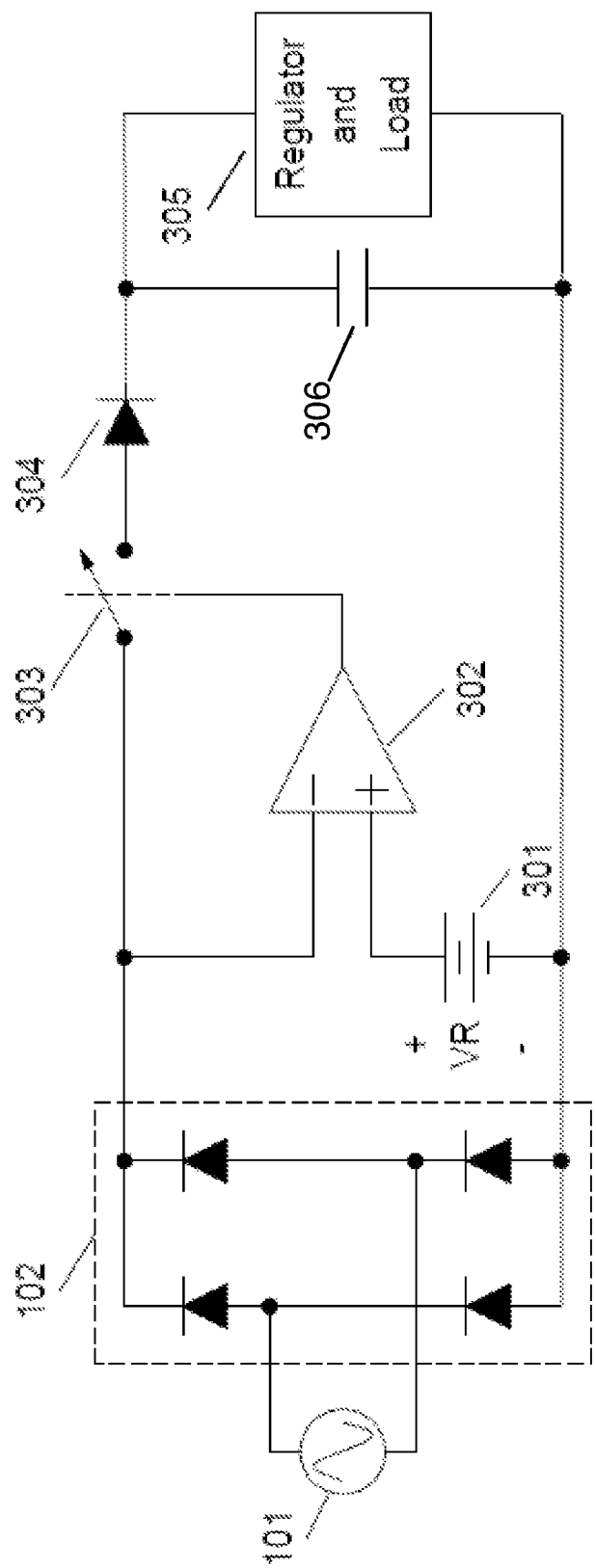
FIG. 3 is a schematic diagram showing the functions in the improved circuit.

In order to improve the efficiency of these prior art series regulator circuits, the power dissipated in the pass transistor must be significantly reduced. In one embodiment of the present invention, the pass transistor is disconnected from the rectified supply voltage when it is not needed. FIG. 3 shows a schematic diagram of an improved rectifier circuit that includes the AC mains 101, the diode bridge 102 and filter capacitor 306, but having additional circuitry inserted between the diode bridge 102 output and the filter capacitor 306. The waveform at the diode bridge 102 output is simply a full-wave rectified sinusoidal waveform that conventionally varies from 0V to approximately 170V peak for a conventional AC mains having an rms value of 120V. Note, however, that the method described below applies to any periodic power waveform assuming that the numeric specifications of the affected components are suitably adjusted. Additionally, the power waveform can include a DC offset if it is smaller than the reference voltage described below.

The additional circuitry includes a comparator circuit 302 having its inverting input connected to the diode bridge 102 output and a voltage reference 301 connected to its non-inverting input, wherein the comparator 302 controls a series switch 303 that disconnects the diode bridge output from succeeding circuitry (opens switch 303) if the diode bridge output voltage exceeds the reference voltage $V_R$. When the reference voltage $V_R$ exceeds the diode bridge output voltage then switch 303 is closed and capacitor 306 is charged through series diode 304. Diode 304 keeps capacitor 306 from discharging back through switch 303 when the diode bridge output voltage decreases. The combination of diode 304 and capacitor 306 form a "peak detector" circuit that stores energy in each one-half of an AC mains cycle to supply to subsequent regulator circuitry and the load 305. Unlike the prior art examples, the voltage across capacitor 306 need only be large enough to satisfy the energy requirement of the subsequent regulator circuitry and load 305. The capacitor 306 need not be a large electrolytic capacitor. A much smaller, for example ceramic, capacitor will suffice depending upon the demands of the regulator and load 305. The input voltage to the series regulator is significantly reduced compared to the rms value of the AC mains. The operation of the "peak detector" circuit ensures the steady-state voltage stored on capacitor 306 is always $V_R$, regardless of fluctuations in the peak voltage of the AC mains, as long as the voltage of the AC mains remains larger than $V_R$. This embodiment of a switching circuit operates as a voltage regulator circuit itself. Since the operation of switch 303 uses negligible energy, the efficiency of the overall improved AC-DC converter circuit shown in FIG. 3 is much larger than seen for the prior art circuits of FIGS. 1 and 2. An additional benefit is a significant reduction in operating temperature rise. Although the comparator 302 is a well-known analog circuit element other analog or digital circuits could be employed to accomplish the desired thresholding function needed to operate switch 303. In one embodiment the reference voltage VR is fixed. In another embodiment, the reference voltage can be varied. In another embodiment the reference voltage is selectable. In one embodiment the circuit of FIG. 3 is connected to the load and the regulator aspect of the circuit is used to control voltage supplied to the load. In another embodiment an additional regulator is used in series with the circuit of FIG. 3 and the load.

Figure 4:
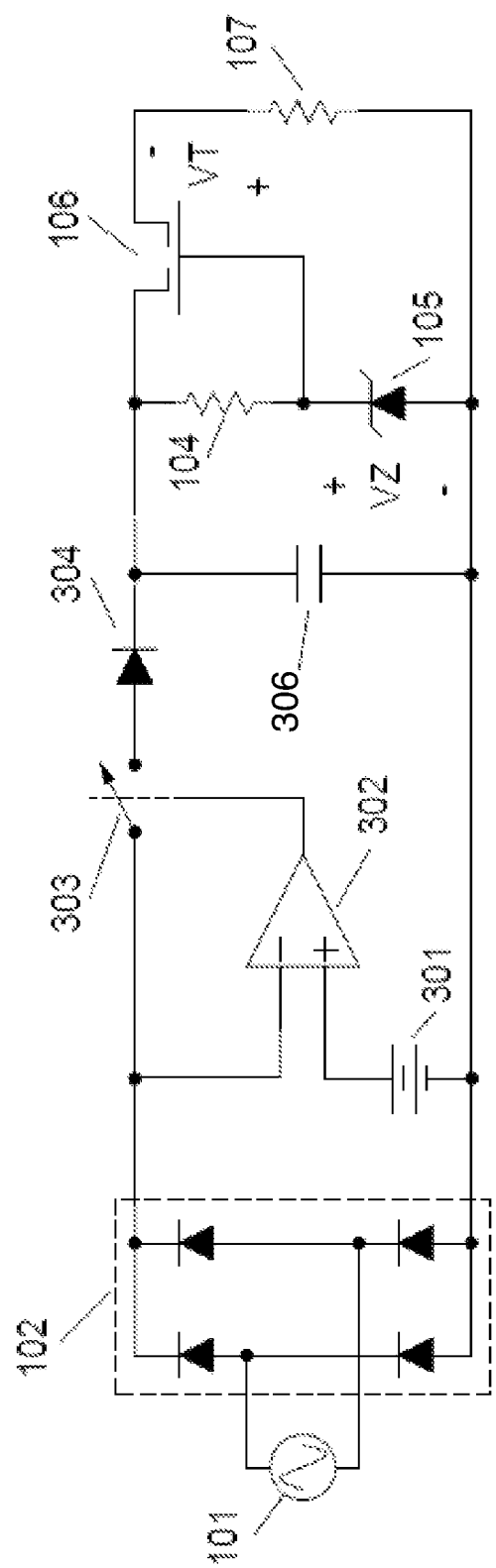
FIG. 4 is a schematic diagram showing the improved AC-DC converter.

FIG. 4 shows a schematic diagram of the improved rectifier circuit interconnected to the series regulator 306, 104, 105, 106 and load 107 and provides a convenient basis for establishing the relationships among design variables in the new rectifier circuit. To maintain regulation of the output voltage, the voltage across capacitor 306 must exceed the Zener voltage, $V_Z$. However, capacitor 306 will discharge linearly in time over a half period of the AC mains due to the current provided to the load 107. Thus, capacitor 306 must initially be charged to a peak voltage $V_{peak}=V_Z+I_{load}*t_{MAINS}/(2*C306)$, where $t_{MAINS}$ is the period of the AC mains waveform. This gives the value of capacitor 306 as a function of the difference between $V_{peak}$ and $V_Z$. Higher values of $V_{peak}$ result in higher power dissipation in pass transistor 106, and this can be traded against the maximum practical value of capacitor 306. The efficiency of the regulator is the ratio of the power delivered to the load divided by the total power dissipated in the circuit and is given by $2*(V_Z-V_T)/(V_Z+V_{peak})$.

Figure 5:
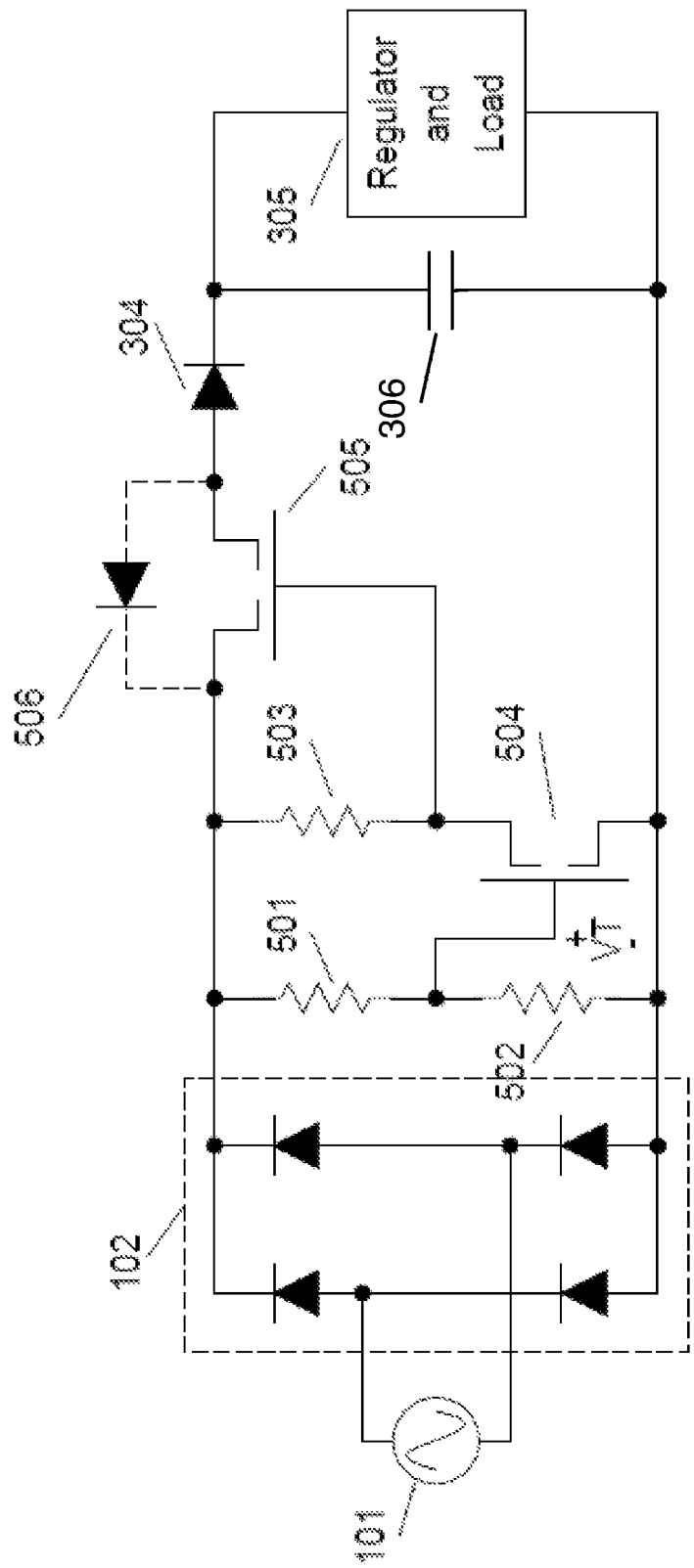
FIG. 5 is a schematic diagram of an embodiment of the improved circuit using MOS field-effect transistors.

FIG. 5 shows a schematic diagram of the improved rectifier circuit wherein the switch 303 is implemented using an enhancement mode MOSFET 505 and the comparator circuit is realized as a single common-source amplifier stage also using an enhancement mode MOSFET 504 characterized by a threshold voltage, $V_T$, and a load resistor 503.

Thus, when the output of the voltage divider network comprising resistors 501 and 502 exceeds the threshold voltage of MOSFET 504, $V_T$, the gate of switch 505 is pulled to ground thereby opening switch 505. When the output of the voltage divider network is smaller than $V_T$ the gate of MOSFET 505 is connected to its drain, thereby closing the switch. However, MOSFET 505 is not an ideal switch, and significant power dissipation may be experienced while it is in its conducting state, so that the efficiency of the circuit realized using MOSFETs will not be as great as that obtained in the ideal case shown in FIG. 4. Additionally, as a result of their unique fabrication process, power MOSFETs typically include a parasitic source-to-drain diode 506 that can allow capacitor 306 to discharge when MOSFET 505 is "off." Series diode 304 obviates this spurious discharge path. The existence of the parasitic diode 506 is assumed in subsequent diagrams. Note that it is feasible that, with the possible exception of energy storage capacitor 306, depending upon the power requirements of the regulator and load 305, all of the components of FIG. 5 could be fabricated on a single semiconductor chip.

This specific circuit shares the weakness of the simple series regulator circuit of FIG. 1 in that the current through pass transistor 505 is not limited, leading to the potential damage of MOSFET 505 and diode 304 by excessive transient current, particularly during start-up conditions when capacitor 306 may be fully discharged.

Figure 6:
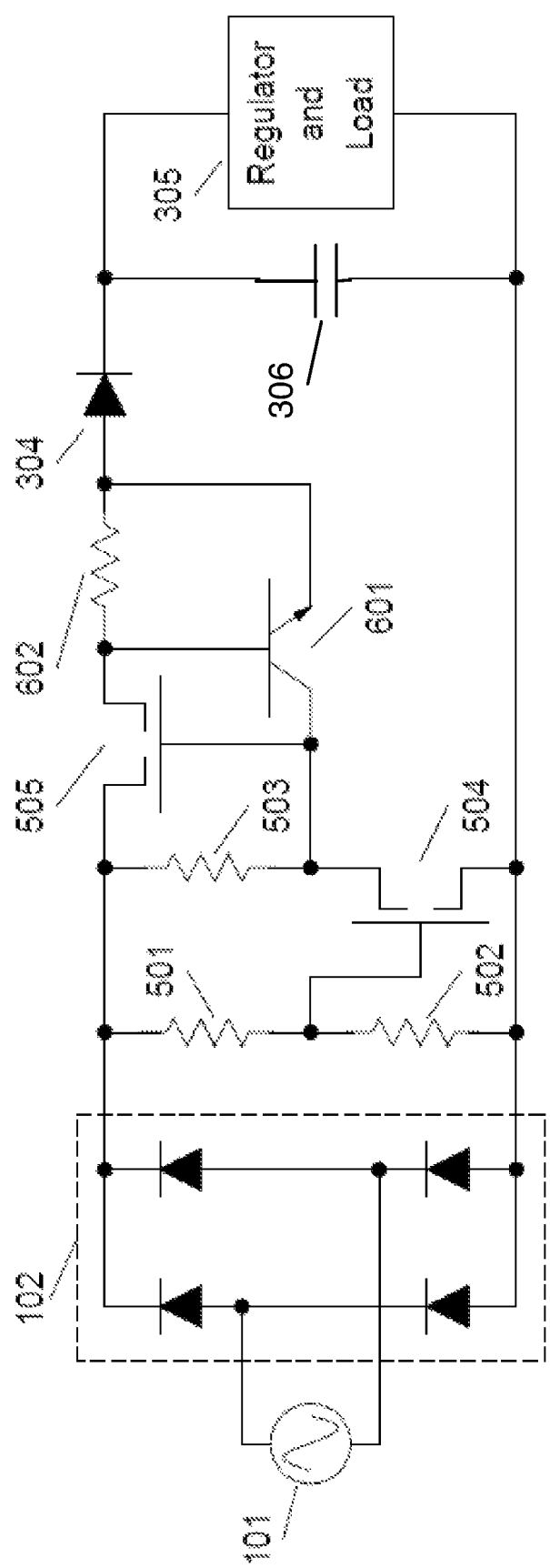
FIG. 6 is a schematic diagram of the embodiment of FIG. 5 including a current limiting function.

FIG. 6 shows a further improved rectifier circuit now including bipolar transistor 601 and current sensing resistor 602 to limit the charging current through MOSFET 505 and diode 304 as previously illustrated in FIG. 2 as an improvement to the prior art series regulator circuit shown in FIG. 1.

Figure 7:
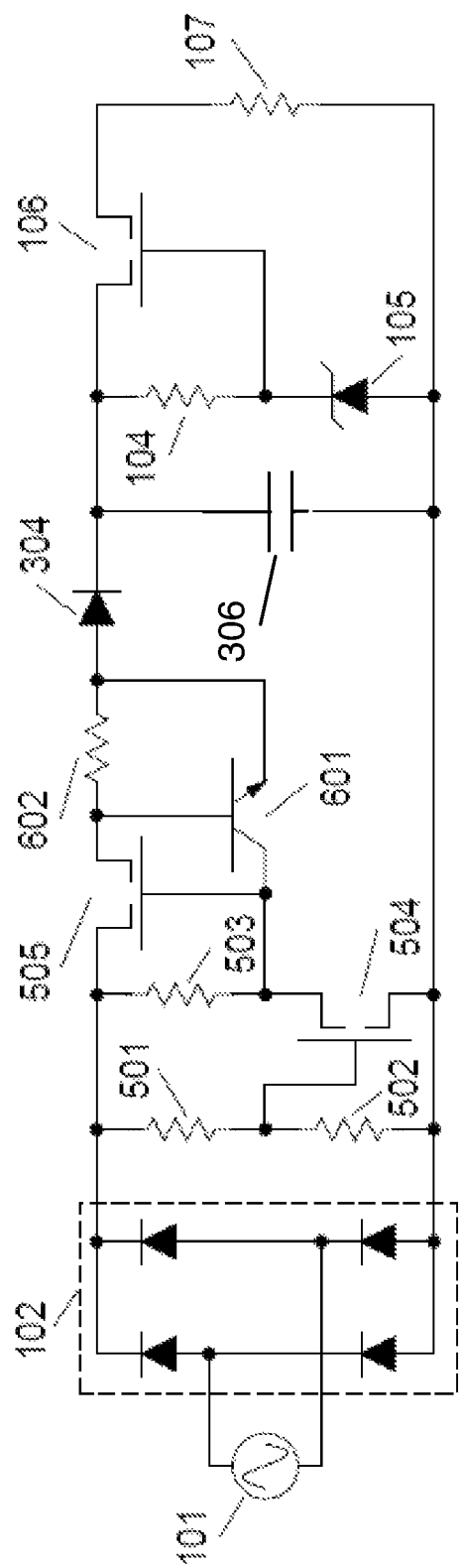
FIG. 7 is a schematic diagram of an embodiment of the improved AC-DC convertor using MOS transistors.

FIG. 7 is a schematic diagram showing the complete high efficiency AC-DC converter with the improved rectifier circuit of FIG. 6 connected to the series regulator 306, 104, 105, 106.

Figure 8:
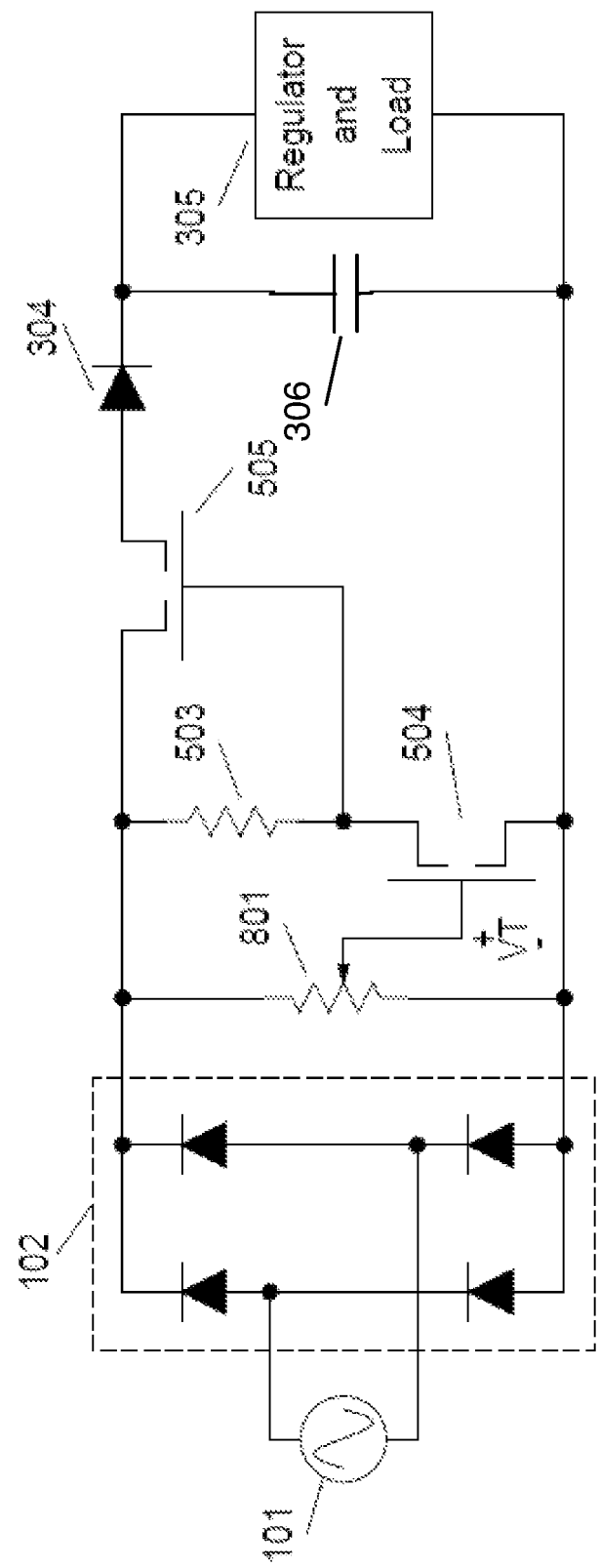
FIG. 8 is a schematic diagram of an embodiment of the improved circuit using MOS field-effect transistors in which the output voltage is manually adjustable.

FIG. 8 is a schematic diagram of an embodiment of the improved circuit using MOSFETs in which the output voltage is manually adjustable. Resistors 501 and 502 in FIG. 5 are replaced with potentiometer 801 which can be manually adjusted to change the voltage waveform applied to the gate of MOSFET 504, thereby changing the voltage stored on capacitor 306.

Figure 9:
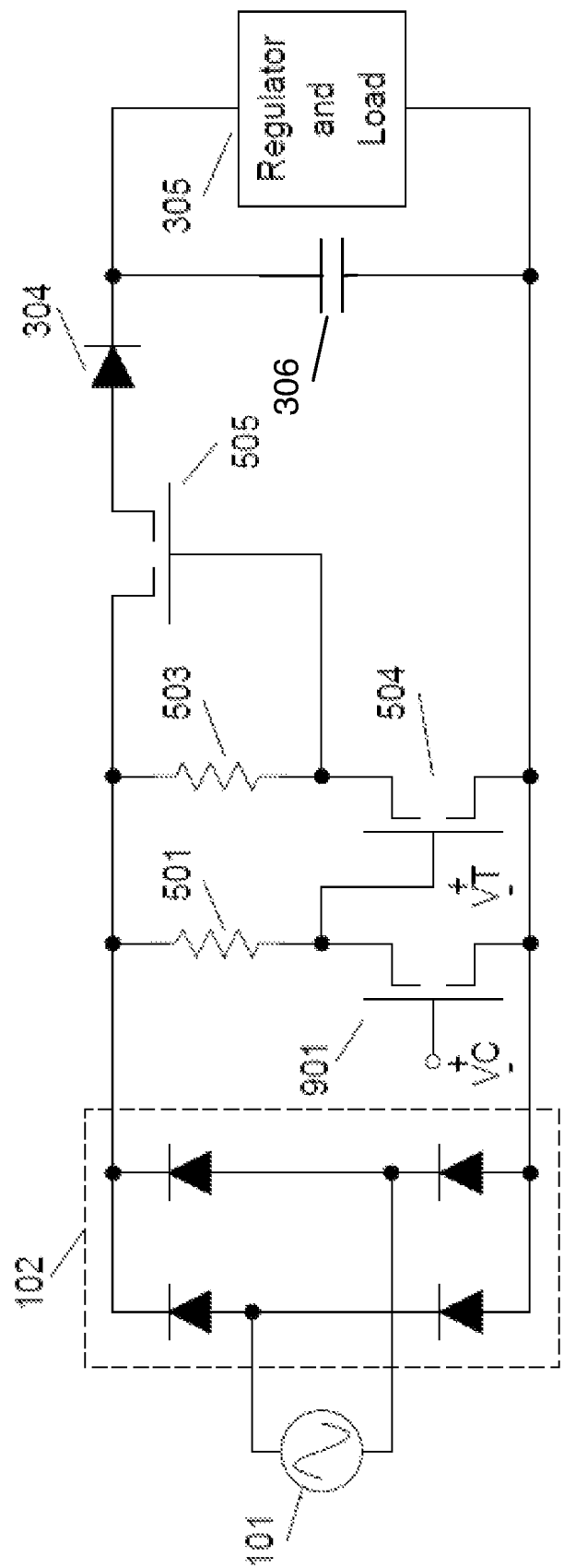
FIG. 9 is a schematic diagram of an embodiment of the improved circuit using MOS field-effect transistors in which the output voltage is electronically adjustable.

FIG. 9 is a schematic diagram of an embodiment of the improved circuit using MOSFETs in which the output voltage is electronically adjustable. Additional MOSFET 901 is connected in place of resistor 502 in FIG. 5 and an external DC control voltage, $V_C$, is applied to the gate of MOSFET 901, thereby changing the voltage applied to the gate of MOSFET 504 and changing the voltage stored on capacitor 306.

Figure 10:
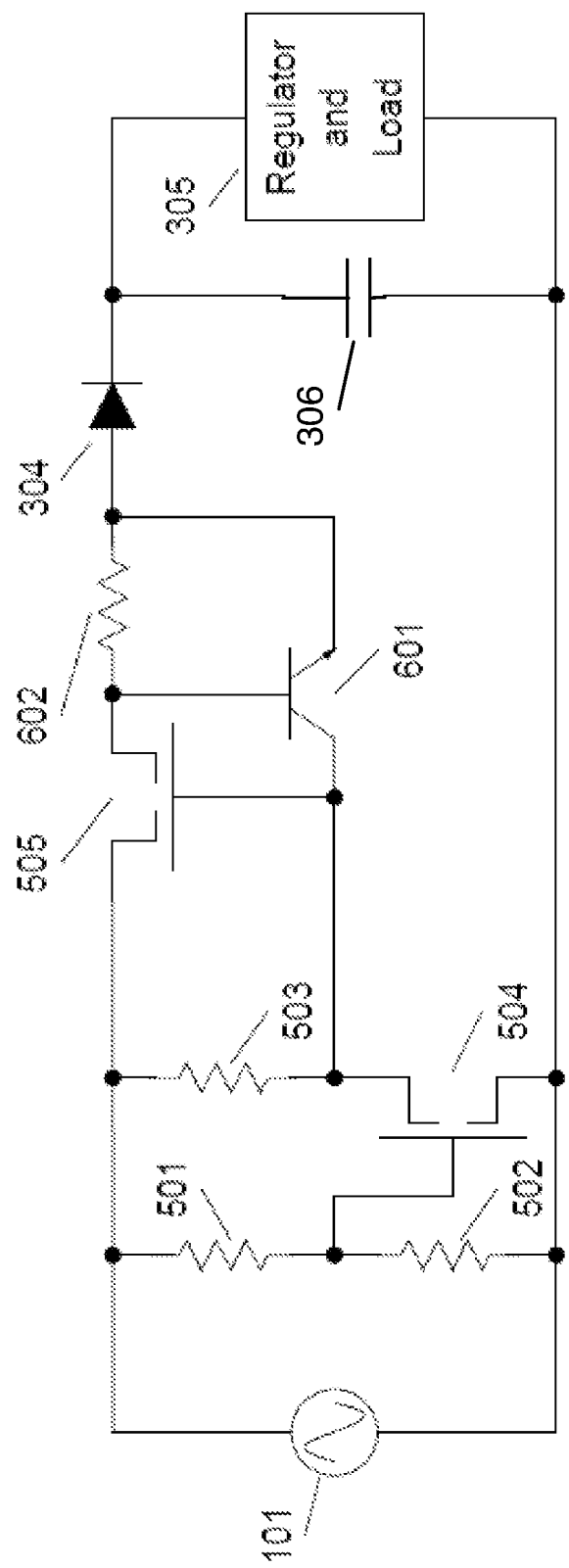
FIG. 10 is a schematic diagram of a first embodiment that eliminates the need for a rectifier.

In another embodiment, shown in FIG. 10, the full-wave bridge rectifier 102 is eliminated and the AC mains 101 is connected directly to the voltage divider 501, 502.

In another embodiment (not shown) the embodiment shown in FIG. 6 is used without the rectifier 102. Analogously other embodiments include the embodiments described in FIGS. 7-9 except that the rectifier 102 is removed.

Figure 11:
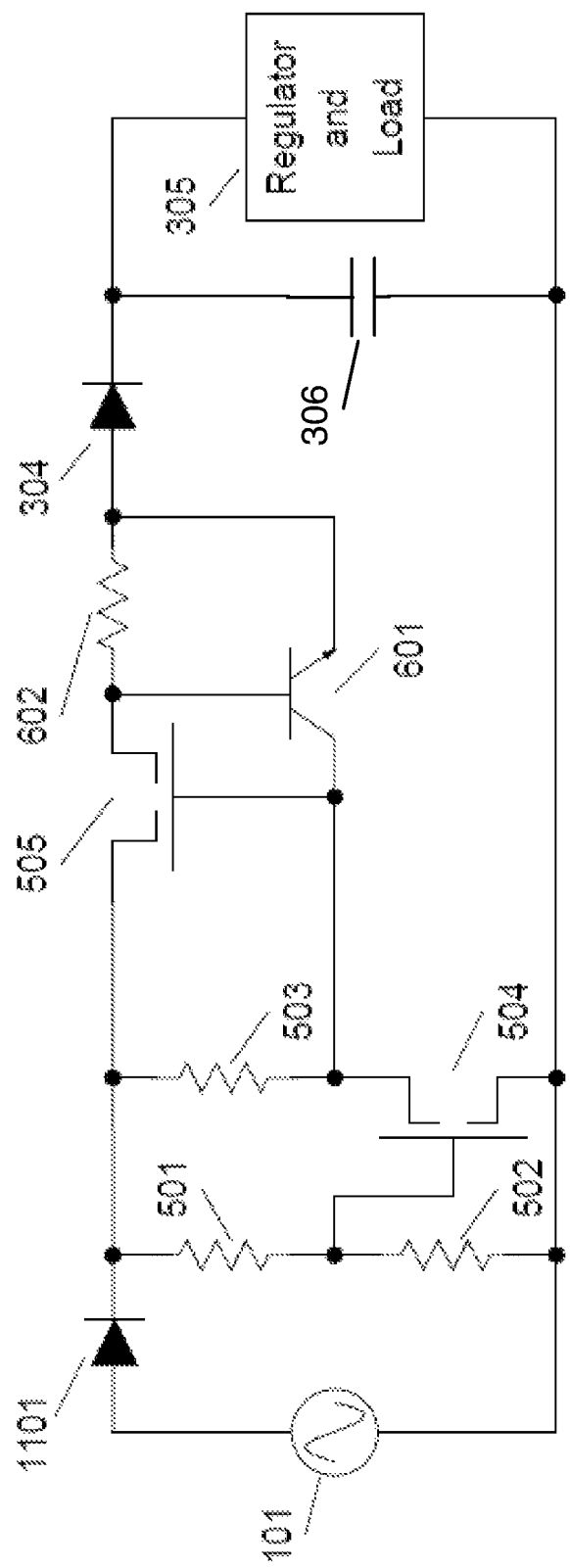
FIG. 11 is a schematic diagram of an embodiment that modifies the embodiment of FIG. 10.

Connecting an AC source 101 directly to the voltage divider may require an unusually robust switch 505 or restrictions on the nature of the AC source. FIG. 11 is a modification of the embodiment shown in FIG. 10 that includes rectifier diode 1101 which acts as a half-wave rectifier and relieves such stringent electrical requirements imposed on switch 505 by the circuit of FIG. 10.

Figure 12:
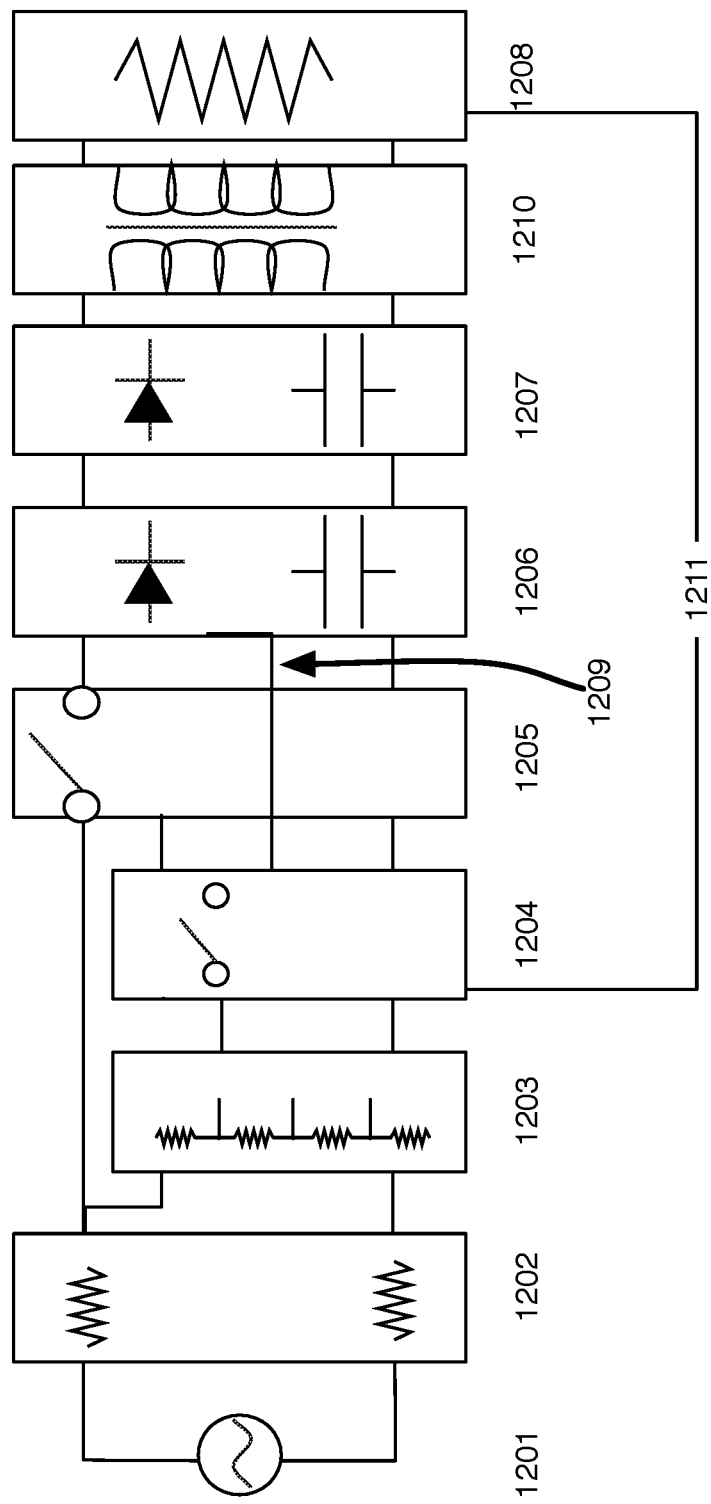
FIG. 12 is a block diagram of a second embodiment that eliminates the need for a rectifier.
Figure 13:
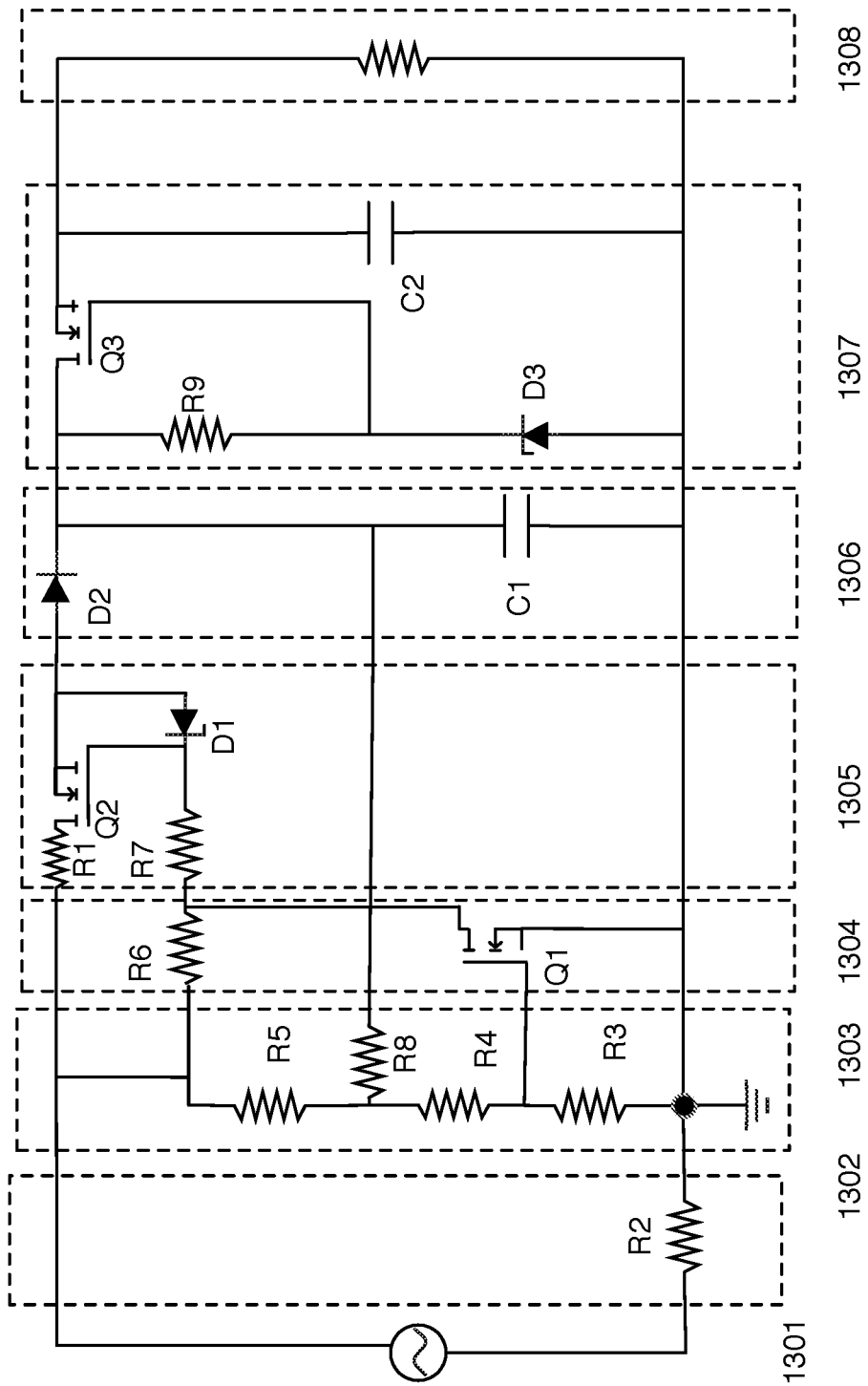
FIG. 13 is a schematic diagram of the embodiment of FIG. 12.

In another embodiment the AC to DC converter, that does not require a rectifier, is comprised, generally, of the elements shown in FIG. 12 and the method implied by these elements. A non-limiting specific example of the circuit elements is shown in FIG. 13. Referring to FIG. 12 the AC source 1201 is connected to an inrush protection element 1202. In one embodiment the inrush element is comprised of resistor elements in the line and neutral of the AC supply. In another embodiment, where higher power and efficiency is required the inrush protection includes switch elements that provide high resistance at startup and switch the resistor elements out of the circuit at steady state operation. After the inrush protection the AC source is sampled using a sampling element 1203. In one embodiment the sampling element 1203 includes resistors configured into a voltage divider network. One embodiment is the voltage divider as shown and discussed in FIG. 5. In another embodiment the sampling element includes a reference voltage source and comparator as shown in FIG. 4. In another embodiment the sampling element can be manually adjusted as shown in FIG. 8. In another embodiment the sampling element can be automatically adjusted as shown in FIG. 9.

The sampled voltages are used as supply to a switch driver element 1204. In the preferred embodiment, the switch driver element 1204 receives a feedback voltage signal 1209 from the storage element 1206 and based upon the voltage signal, controls the voltage applied to the gate of a switching element in the control switch and clamp element 1205, thereby opening and closing the control switch 1206 to supply power to the storage element 1206 and ultimately the load 1208. In one embodiment, where the feedback 1209 is removed, the AC to DC converter is a feed forward converter where charging of the storage element 1206 is controlled from the forward side 1203, 1204 and 1205.

Addition of the feedback control 1209 provides a means for both feed forward and feedback control. In one embodiment the balance of feed forward and feedback control is determined by the selection of components in the voltage sampling element 1203 and the feedback line 1209. In one embodiment the balance of feedforward and feedback control is determined by resistor elements in the sampling element 1203 and the feedback 1209.

In another embodiment variable elements are used such that the feedforward and feedback control can be adjusted. In a preferred embodiment the switch driver is comprised of a voltage divider and a switch. The switch and clamp element 1205 controlled by the switch driver 1204 provides pulsed power at a fixed maximum current to the storage element 1206. In the preferred embodiment the switch and clamp element is comprised of an N-MOSFET and a Zener diode, connected source to gate, limits/clamps the peak voltage, and therefore peak current, to a pre-selected peak voltage value.

In one embodiment the preselected limiting voltage is determined by value of the Zener voltage of the Zener diode bridging gate to source of an N-MOSFET component of the switch 1205. Power from the switch and clamp element comprised of pre-selected peak current pulse is provided to a storage element 1206. In one embodiment the voltage regulator is comprised of a capacitor used as an energy storage element and a diode.

Figure 15:
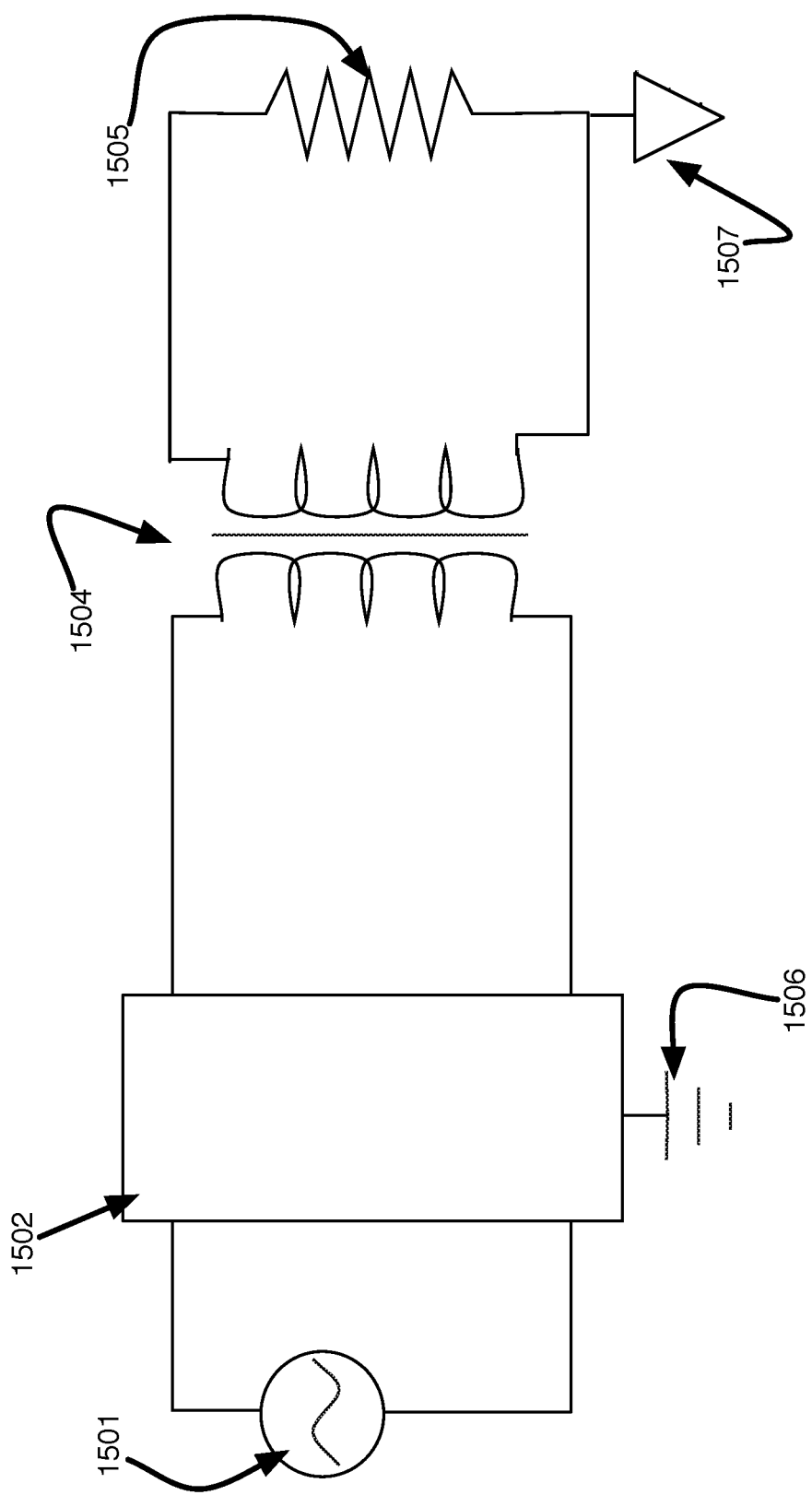
FIG. 15 shows an embodiment of an AC to DC converter of the present invention that includes isolation of the load from the source.
Figure 16:
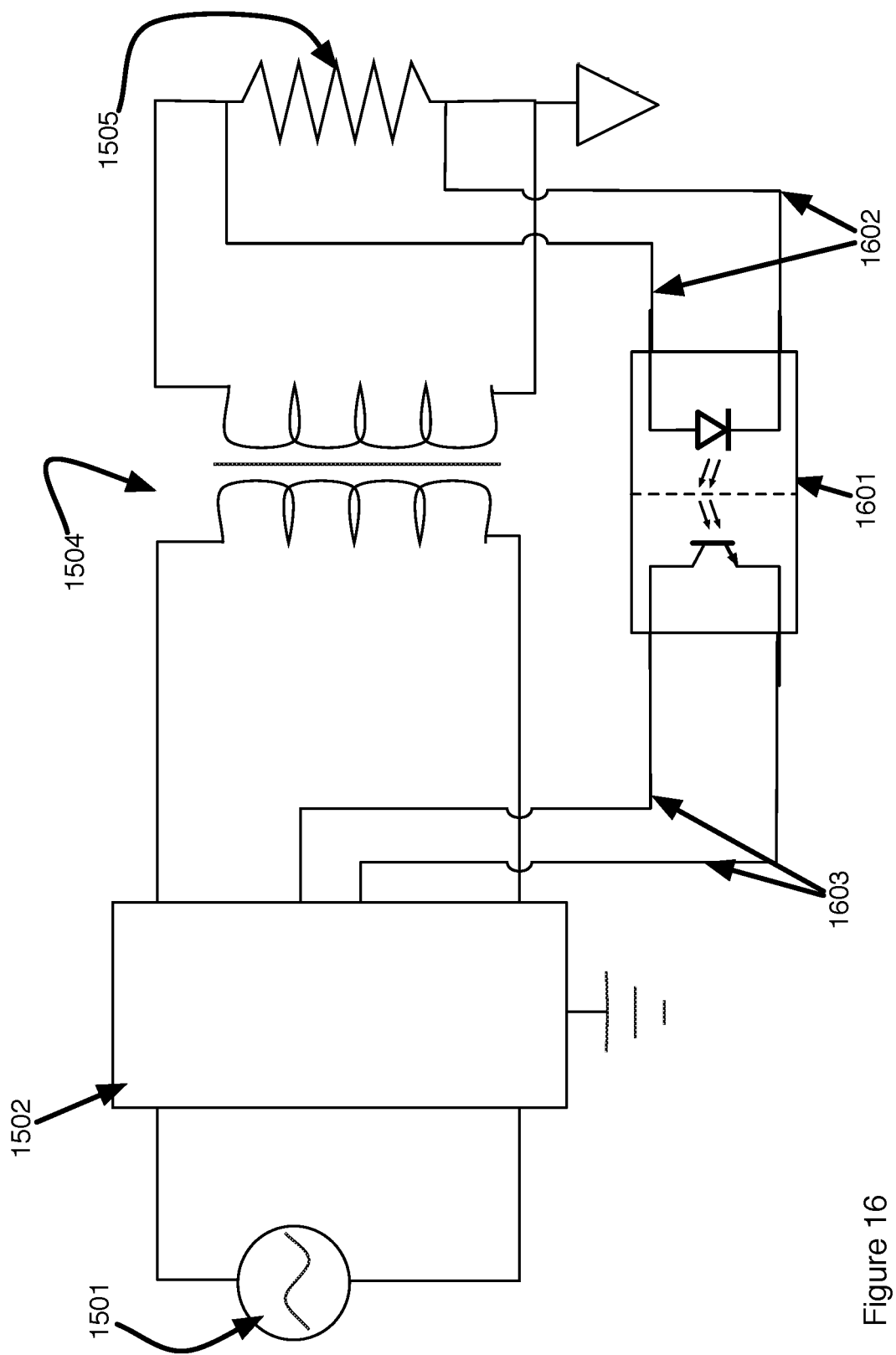
FIG. 16 shows an embodiment of an AC to DC converter of the present invention that includes isolation of the load from the source and further includes feedback control from the load to the AC to DC converter.

Charge on the capacitor is fed back through a voltage divider circuit to the switch driver 1204 thereby maintaining a constant charge on the capacitor. Output from the storage element is fed through a voltage regulator 1207 to the load 1208. In another embodiment the AC to DC converter further includes a galvanic isolation element 1210. The galvanic isolation unit is further discussed in conjunction with FIGS. 14-16. In another embodiment the AC to DC converter further includes elements 1211 that enable feedback from the load 1208. In the preferred embodiment the feedback circuit 1211 also includes galvanic isolation between the control element 1204 and the load 1208.

FIG. 13 shows the preferred embodiment of the AC to DC converter. The individual components of the circuitry work much as the components of the circuitry already described in FIGS. 5-11. Elements 1301 through 1308 correspond to elements 1201 to 1208 of FIG. 12 respectively. The AC source 1301 is connected to the inrush protection circuit 1301 comprised in this preferred embodiment of resistors R1 and R2. In another embodiment (not shown) the inrush protection includes switches such that the current flows through the resistors R1 and R2 at startup and bypasses the resistors once steady state operation is reached. In another embodiment the inrush control uses inductors; that is elements R1 and R2 are replaced with inductors L1 and L2. Output from the inrush protection goes to the switch Q2 of the switch and clamp circuit 1305 and to the voltage sampling element 1303. The voltage sampling element 1303 is comprised of resistors R3, R4, R5 sampling the AC input and resistor R8 providing a feedback voltage from storage capacitor C1. The values of R3, R4, R5 and R8 are selected such that the voltage to the gate of switch Q1 in the switch driver element 1304 turns switch Q1 on and off and thereby synchronously turns switch Q2 off and on thereby providing a preselected timed output pulse from switch Q2 to charge storage element C1. Resistor R8 provides a feedback path as to the charge on capacitor C1 and therefore the output voltage to the voltage sampling circuit 1303 and therefore to the control circuit 1304. The switch and clamp element 1305 is comprised of switch Q2, Zener Diode D1 and resistor R7. The switch Q2 is controlled by the switch driver circuitry 1304. The peak output current of switch Q2 is clamped to a preselected value based upon the selected values of the Zener voltage of diode D1. Pulsed output from the switch Q2 is connected to the voltage regulator 1306 which through the feedback of R8 to the voltage sampling 1303 and the switch driver 1304 holds capacitor C1 to a constant charge. Control element switch Q1 and therefore supply switch Q2 are activated, either opened or closed, in synch with the AC input 1301. The AC to DC converter provides a low voltage output with pulse modulation at the frequency of the incoming AC source. The switches are activated, either opened or closed, at voltages that are near, within the threshold values for the components Q1 and Q2, of the zero crossing of the AC source. The Output then goes to voltage regulator 1307 and then load 1308. The voltage regulator 1307 includes switch Q3, Zener diode D3 resistor R9 and capacitor C2. Circuit components D3, Q3, R9 function as a voltage regulator equivalently to that already described for circuit elements 105, 104, 106 respectively in FIG. 1. Capacitor C2 provides storage capacity to buffer and thereby smooth the output from the AC to DC converter to the load 1308.

The AC to DC converter in the preferred embodiment of FIGS. 12 and 13 is comprised of elements of inrush protection 1202, voltage sampling 1203, a switch driver 1204, a switch and clamp 1205, a storage element 1206 and a voltage regulator 1207. Selection of components in the voltage sampling 1203 determine the timing of the switch driver 1204. Selection of elements in the switch and clamp determine a peak voltage and current for out pulses. Power output is controlled by selection of both the peak current and the pulse timing. Feedback from the storage element through the voltage sampling is used to select the pulse timing. The AC to DC converter operates in sync with the AC source.

The preferred embodiment of FIGS. 12 and 13 include in general a voltage divider 1203 connected to the power source 1201, and, a first switch 1204 connected through its input to the voltage divider, and, a second switch 1205 whose input is connected to the output of the first switch, and, a storage capacitor C1 connected through a diode to the output of the second switch, and, a sense resistor connected 1209 between the storage capacitor and the voltage divider thereby providing feedback control of the AC direct to DC extraction conversion system, and, a Zener diode D1 connected between the input and output of the second switch thereby clamping the voltage of the output and input of the second switch to the Zener voltage of the Zener diode, and, the electronic load 1208 connected to the storage capacitor C1. The switches 1204, 1205 may be any electronically actuated switch. In one embodiment the switches are N-MOSFETs. In another embodiment the switches are bipolar transistors and in another embodiment the switches are microelectromechanical switches.

Figure 14:
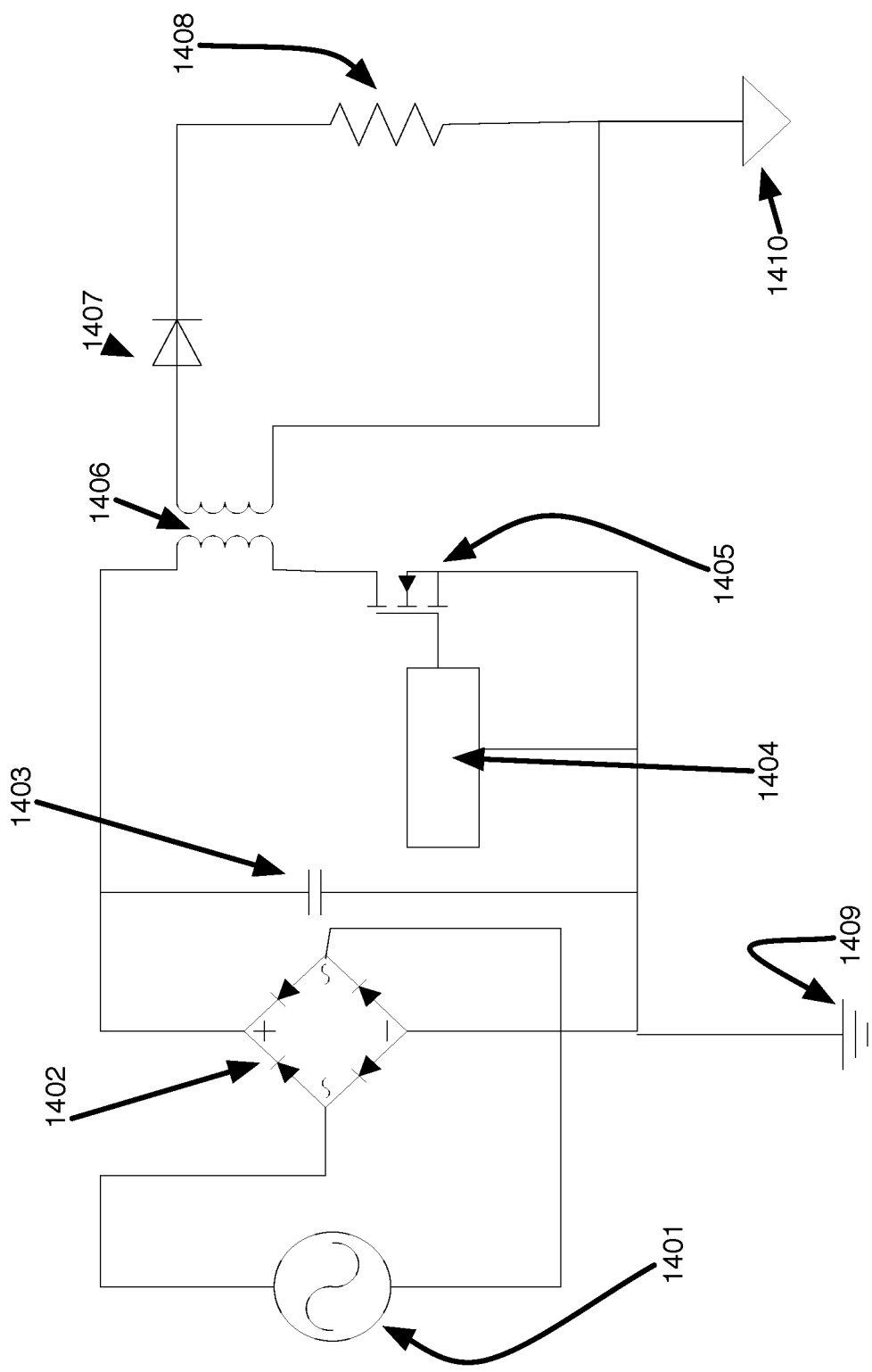
FIG. 14 shows prior art for an AC to DC converter that includes isolation of the load from the source.

FIG. 14 shows a prior art AC to DC converter system that includes Galvanic isolation of the AC source 1408 from the load. The typical prior art AC to DC converter includes full wave rectification 1402 that provides a grounded 1409 DC source that is filtered 1403 includes a controller 1404 that is typically a pulse controller that uses a switch 1405 to control the output through a transformer 1406 thereby providing DC voltage to the load 1408. A Diode 1407 prevents flow of current from the load back through the transformer 1406. Typically, the transformer also acts as a step down transformer to control the voltage required by the load 1408. Note that the high side of the transformer 1406 operates at the rectified voltage of the AC source 1401. Although the transformer does provide galvanic isolation the high voltage connected to the transformer thereby requires a transformer that can operate with this high voltage. By contrast the power supply of the instant invention is shown in a first embodiment of FIG. 15. The AC source 1501 is connected through the AC to DC converter 1502 through an isolation transformer 1504 to the load 1505. The ground 1506 on the AC to DC converter 1502 is not necessarily at the same level as the ground 1507 on the load 1505. In a preferred embodiment the AC to DC converter 1502 is as described in FIGS. 12 and 13. The AC to DC converter 1502 includes clamping of the output voltage supplied to a storage capacitor (C1 of FIG. 13) such that the isolation transformer 1504 sees at most the clamped voltage. In a preferred embodiment and comparison of FIGS. 13 and 15 the isolation transformer is located between block elements 1307 and 1308, analogous to FIG. 12 where the galvanic isolation element is located between 1207 and 1208. Another embodiment, shown in FIG. 16, further includes feedback from the load 1505 to the AC to DC converter 1502. The feedback is provided through sense lines 1602 that pass through an isolator 1601 and through, then isolated sense lines 1603, to the AC to DC converter. In one embodiment one of the sense lines 1603 is grounded and the other feeds into the voltage sampling circuit 1303 much as the sense line shown in FIG. 13 feeds from capacitor C1 through resistor R8. In one embodiment the isolator 1601 is an optical isolator as shown in the figure. In another embodiment (not shown) a transformer is used for the isolator in place of the optical isolator.

FIGS. 12, 13, 15 and 16 show a AC to DC converter may be fully integrated on silicon. Not all of the components shown in the figures are required for a fully functional device. In one embodiment, the AC to DC converter consists of a voltage divider (1303) connected to and sampling the AC source 1301 and further connected to the base of first switch transistor, Q1. The values of the resistor in the voltage divider control the voltage seen by Q1 and thereby provide fed forward control of Q1 and therefore the output of the AC to DC converter. The drain of Q1 is in turn connected to the base of a second switch transistor, Q2 which supplies pulsed current to a storage device C1. A diode D2 prevents discharge of the capacitor C1 back through the switch Q2. A sense line is connected from the storage element C1 through a resistor R8 into the voltage divider 1303 and provides feedback control to prevent full discharge of the storage capacitor C1. A Zener diode D1 connected source of base of Q2 clamps the voltage seen by C1 to the Zener voltage of the diode D1. An inductor or low resistance wire wound resistor R1 in series in the AC line, filters transients and limits current seen by Q2. Therefore, a fully functional AC to DC converters is seen to consist of a voltage divider, two switches, a storage device, a Zener diode, a regular diode, and an inductor, wherein the switches are N-MOSFETs and the storage device is a capacitor. In another embodiment the AC to DC converter further includes inrush control 1302. In one embodiment the inrush control consists of a resistor connected in series in the line and neutral of the AC source. In another embodiment the AC to DC converter further consists of a voltage regulator. In one embodiment the voltage regulator consists of a switch Q3 connected in output line from the storage device C1. The switch is controlled through a Zener diode D3 connected to its base from a capacitor C2. The output of the voltage regulator is connected to the load 1308. In another embodiment the AC to DC converter further incudes galvanic isolation, wherein the galvanic isolation is an isolation transformer connected to the output of the voltage regulator. In another embodiment there is no voltage regulator and the isolation transformer is connected between the storage capacitor C2 and the load 1308. Another embodiment further includes feedback from the load to the voltage divider 1303. The feedback from the load is fed through a second isolation transformer 1601 to the voltage divider 1303.

SUMMARY

An improved AC direct to DC extraction conversion system is described. The AC direct to DC extraction conversion system consists of an efficient electronic switch employed to provide controlled pulsed power to a storage device. The AC to DC converter in one minimal version consists of a pair of N-MOSFET transistors, a voltage divider, a storage element and a pair of diodes. The design enables high efficiency with minimal components that may be fully integrated onto silicon.

We claim:

1. An AC direct to DC extraction conversion system for providing energy directly from an alternating current (AC) power source in a direct current (DC) to an electronic load comprising:
   a) a voltage divider connected to the power source, and,
   b) a first switch, having an input and an output, connected through its input to the voltage divider, and,
   c) a second switch, having an input and an output, whose input is connected to the output of the first switch, and,
   d) a storage capacitor connected through a diode to the output of the second switch, and,
   e) a sense resistor connected between the storage capacitor and the voltage divider thereby providing feedback control, and,
   f) a Zener diode connected between the input and output of the second switch thereby clamping the voltage of the output and input of the second switch to the Zener voltage of the Zener diode, and, g) the electronic load connected to the storage capacitor, and, h) sense lines from the load passing through an isolator to the voltage divider thereby providing feedback control from the load to the AC direct to DC extraction conversion system.

2. The AC direct to DC extraction conversion system of claim 1 wherein the first switch and the second switch are both N-MOSFETs.

3. The AC direct to DC extraction conversion system of claim 1 wherein the first switch and the second switch are both bipolar transistors.

4. The AC direct to DC extraction conversion system of claim 1 wherein all semiconductor devices are fabricated on a single integrated circuit chip.

5. The AC direct to DC extraction conversion system of claim 1, further comprising a series voltage regulator circuit interposed between said energy storage element and said electronic load.

6. The AC direct to DC extraction conversion system of claim 1 wherein the voltage divider is manually adjustable.

7. The AC direct to DC extraction conversion system of claim 1 wherein the voltage divider is electronically adjustable.

8. The AC direct to DC extraction conversion system of claim 1 further including an isolation transformer between the storage capacitor and the electronic load.

* * * * *